United States Patent [19]

Binckley

[11] 4,131,250
[45] Dec. 26, 1978

[54] HELICOPTER BLADE ICE PROTECTION SYSTEMS

[76] Inventor: Earle T. Binckley, 31812 National Park Dr., Laguna Niguel, Calif. 92677

[21] Appl. No.: 806,091

[22] Filed: Jun. 13, 1977

[51] Int. Cl.² .............................................. B64D 15/10
[52] U.S. Cl. .................................................. 244/134 R
[58] Field of Search ................. 244/134 R, 134 C, 36; 416/95

[56] References Cited

U.S. PATENT DOCUMENTS

| | | | |
|---|---|---|---|
| 1,720,140 | 7/1929 | O'Connor | 244/134 C |
| 1,828,613 | 10/1931 | Norton | 244/134 C |
| 2,412,846 | 12/1946 | Taylor | 244/134 C |
| 2,576,487 | 11/1951 | Stanley | 244/134 C |
| 3,936,018 | 2/1976 | Barlow | 244/136 |

Primary Examiner—Galen L. Barefoot

[57] ABSTRACT

An external system installed on a helicopter to spray a freezing point depressant fluid onto the main rotor blade of a single rotor helicopter to prevent the collection of ice when flying through icing weather. Actuation of this ice protection system will cause a pump to force a glycerine-alcohol mixture through a series of fixed nozzles to create a spray of freezing point depressant. The main rotor blade will move through this spray and be coated, thus preventing the collection of ice on the blade. Such protection is of vital importance to all-weather helicopter operations as experience has shown that the collection of ice on the rotor blades of helicopters is a safety of flight problem.

1 Claim, 4 Drawing Figures

HELICOPTER BLADE ICE PROTECTION SYSTEMS

BACKGROUND OF THE INVENTION

1. Field of the Invention

Aviation safety

2. Description of the Prior Art

Helicopter operations are growing steadily in the aviation field. As their unique capabilities are understood, the demand for their operation has increased. In both military and civilian flying, helicopter operations cannot be conducted under weather conditions conducive to icing without a rotor blade ice protection system. An unprotected rotor blade accretes ice which disturbs the airflow over the blade, reducing its lifting capability. Also the blade flexing tends to break pieces of ice off of the blade which causes an unbalance situation accompanied by extreme vibration of the whole helicopter. Blade protection from ice must be effected in flight through all-weather conditions if the flight is to be successfully and safely conducted.

Over the past 20 years numerous methods have been attempted to provide an ice protection system for a helicopters main rotor blade. None have been wholly satisfactory and no single system is in general use in the United States. Ice protection for helicopter blades has followed the general trend of ice protection for fixed wing aircraft.

The approaches to precluding ice collection on the rotor blade have included heating the leading edge of the blade to a temperature where ice will not form; covering the leading edge of the blade with a material that has a low adhesion for ice; using mechanical means of removal; and using chemicals from within the blade to flow through holes in the leading edge of the blade where they mix with the impinging super cooled droplets to preclude their freezing on the blade.

Hot air has been circulated through the leading edge of a rotor blade during tests, where it was found that the heat required to protect the entire blade was such that the size of the heat generator was too large to be practical, and that heat losses were so great that the outer portion of the blade could not be protected.

Various types of electrical systems are in use at present. Sufficient heat is not available to preclude ice forming, so the ice is allowed to collect, then the electrical system furnishes heat which melts the bond of the ice and the ice is removed by the airflow over the blade. This type of system is complex, expensive, and often requires more electrical power than a helicopter can provide. In addition, special blades are required.

Numerous material, including teflon, have been installed on rotor blades with the hope that the ice adhesion characteristics would be so low that the airflow and the centrifugal forces would shed the ice. None have proven practical.

Mechanical methods have been successful in removing ice from the fixed wings of an aircraft. Here rubber boots are installed on the leading edge of a wing and when sufficient ice is collected, air is forced into the rubber boot which inflates it, cracking off the ice. This system was tried for helicopters, however the high speed of the rotor blade causes mechanical problems with the inflatable boot and no workable system has been devised. A mechanical method of vibrating the wing to break off the ice has been discussed but no flying model has ever worked.

Chemicals have been successfully used on both fixed wing and rotary wing aircraft to prevent ice formations on lifting surfaces - wings and rotor blades. A Russian designed chemical system for helicopters has proven very effective in preventing ice formation on rotor blades. This system uses a freezing point depressant fluid which is pumped into a slinger ring on the rotor head where it is distributed in the blade through a series of tubes from which it oozes through holes on the leading edge of the blade, covering the blade and precluding ice formation. This requires a special blade with a complex interior system that is only necessary when icing flight is contemplated. It is subject to maintenance problems as the exit holes on the leading edge of the blade are continually exposed to impinging air and dust. The installation and removal of this system is not simple.

This invention proposes an ice protection system using the same principals of chemistry for the ice prevention, but uses a different method of coating the blades with the depressant fluid. The primary purpose in devising the present invention is to supply a device that provides ice protection for the main rotor blade of a helicopter that must operate in all-weather conditions.

A further purpose for devising the present invention is to provide an inexpensive ice protection system that can have external elements which can easily be installed or removed and that does not require a special rotor blade, different from those normally used.

SUMMARY OF THE INVENTION

A fluid distribution system consisting of a pump and fluid storage tank located in the cabin of the helicopter, appropriate plumbing to the top of the helicopter cabin, and a spray bar consisting of plumbing equipped with hydraulic atomizing nozzles located so that the spray will impinge on the rotating main rotor blade.

When it is intended to fly the helicopter through weather where icing conditions are anticipated, the pilot activates the blade ice protection system. The pump forces the fluid through the plumbing to the nozzles where the depressant fluid is sprayed into the path of the rotor blade. As the blade passes through the spray cloud, it becomes coated with the chemical mixture.

The mechanism that causes aircraft icing is the impinging of super-cooled water droplets on the aircraft at temperatures below freezing. A water droplet can exist in temperatures below freezing when it is not disturbed. When it is disturbed, such as impinging on the aircraft structure, the droplet generally flows a short distance over the surface, where it freezes. When the freezing point depressant coating on the rotor blade mixes with the liquid water, freezing is prevented and the liquid is blown from the blade by the airflow.

A major objective of this invention is to provide an inexpensive, practical method of putting a freezing point depressant coating on a standard helicopter rotor blade while the helicopter is in flight.

It is intended that the spray bar be aligned with the normal flight path of the helicopter, and located in a position where the spray concentration is penetrated by each blade as it passes over the nozzle array. The forward flight of the helicopter will cause the spray pattern to be displaced to the rear, allowing the complete blade to be coated. Centrifugal forces will assist moving the liquid coating to the end of the blade. The purpose of the glycerine in the alcohol-glycerine mixture is to reduce evaporation of the mixture and to provide more viscosity to allow it to cling to the blade. The size and weight of the external spray system will have a negligible effect upon the operation of the helicopter.

Another object of the invention is to provide an ice protection system for helicopter rotor blade that can easily be installed and removed. One of the main complaints about rotor blade ice protection systems is that the weight of the installed system must be carried at times when icing conditions are not present, because current systems are not easily removable from the helicopter. The main weight of this proposed system is the fluid carried in the tank. If no icing flight is expected, the tank need not be filled, considerably reducing the protection system weight. Further, the external plumbing can be easily detached and stored to preclude any potential maintenance problems as well as to reduce minor drag and weight considerations.

A still further object of the invention is to provide a rotor blade ice protection system that will not require intricate and extensive modification of the rotor blade, or even a completely new blade. No new blades need be introduced into the logistics system. The standard blades can be used for icing flights as well as for regular flights. This is an extremely desirable cost consideration.

Yet another object of this invention is to provide a rotor blade ice protection system which is inexpensive to purchase, easy to retrofit to existing helicopters, and that can be easily maintained by regular helicopter mechanics because of its extreme simplicity.

DESCRIPTION OF PREFERRED EMBODIMENT

Figure 1:
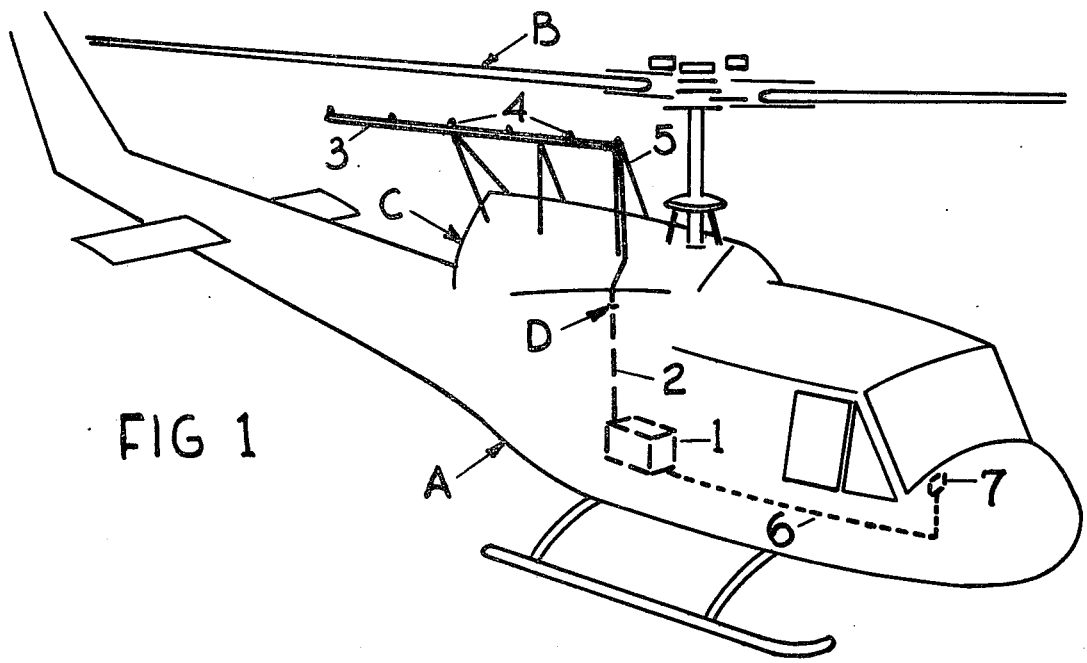
FIG. 1 is a perspective view of a single rotor type helicopter showing the typical mounting of the rotor blade ice protection system.
Figure 2:
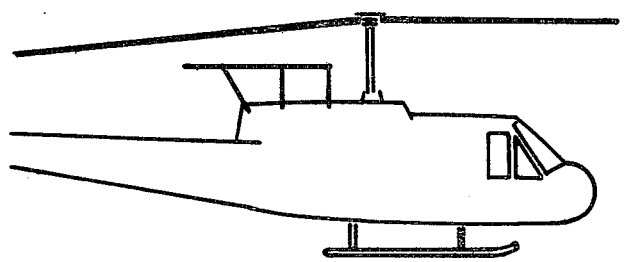
FIG. 2 is a side elevation of the installation.
Figure 3:
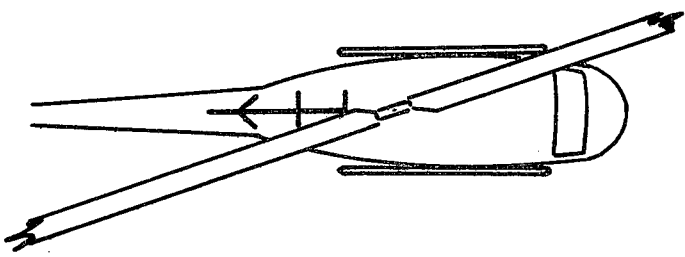
FIG. 3 is a top plan view of the installation.
Figure 4:
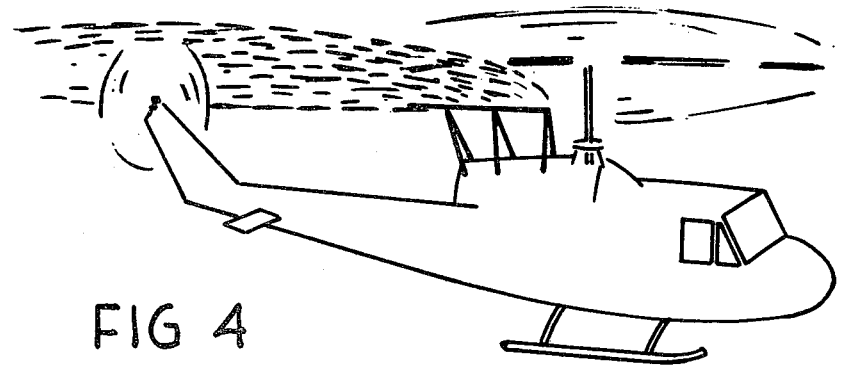
FIG. 4 is a perspective view of the helicopter in flight, showing the spray pattern and the immersing of the main rotor blade in the spray.

The main rotor blade ice protection system is shown in FIG. 1 mounted on a single main rotor helicopter A. It is composed of a tank 1 mounted in the cabin of the helicopter, that carriers a freezing point depressant fluid (a glycerine-alcohol mixture) and contains a pump for moving the fluid up tubing 2 where it goes thru the skin of the helicopter, at D. The tube carrying the fluid is connected to a pipe (spray bar) 3, which is fitted with hydraulic atomizing nozzles 4, all of which are supported by structural members 5 mounted on the helicopter skin C in the shadow area of the rotor mast. The remainder of the system comprises the activation device and consists of wiring 6 which is furnished the helicopters electrical power for running the pump, when the pilot moves the switch 7 to the "on" position.

The fluid holding tank 1 can vary in size and shape, depending upon the length of time that ice protection is required and where the tank must be located in the helicopter.

The pump installation can be either immersed in the fluid in the tank 1 or placed external to the tank in the tubing 2. The design of the pump would be established by the plumbing and nozzle parameters which depend on the particular helicopter being protected.

The length and location of the tubing 2 carrying the fluid to the spray bar 3 will depend upon the configuration of the particular helicopter carrying the installation.

The nozzles 4 that spray the fluid into the air where it is penetrated by the main rotor blade, are hydraulicaly atomized and must be selected to give a droplet size that will penetrate the moving airstream adequately to envelope the rotor blade. The nozzle selection and the number of nozzles depends on the particular helicopter being protected.

The structural members 5 will be round to decrease air drag and will be of a length and location determined for the particular installation. If it is desired to remove the external portion of the protection system during non icing flights, it may be necessary to mount quick-removal hardware on the helicopter skin C where the structural members 5 attach. The skin C may require reinforcing to assure structural integrity.

What is claimed is:

1. A means for preventing the accumulation of ice on a helicopter main rotor blade, the system comprising a tank for carrying the supply of freezing point depressant fluid, a pump mounted in the tank to move the fluid from the tank through tubing to the nozzles, said pump to be actuated by a switch accessible to the pilot, tubing between the tank and the nozzles for carrying the fluid, a nozzle array mounted in the shadow area of the rotor mast, external to the helicopter, and that sprays the fluid upward into the path of the rotor blades.

* * * * *